(12) United States Patent
Ito et al.

(10) Patent No.: US 12,553,974 B2
(45) Date of Patent: Feb. 17, 2026

(54) MAGNETIC RESONANCE IMAGING APPARATUS AND CONTROL METHOD OF THE SAME

(71) Applicant: FUJIFILM Healthcare Corporation, Kashiwa (JP)

(72) Inventors: Kosuke Ito, Chiba (JP); Kazuho Kamba, Chiba (JP); Atsushi Kuratani, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 175 days.

(21) Appl. No.: 18/380,263

(22) Filed: Oct. 16, 2023

(65) Prior Publication Data
US 2024/0151796 A1     May 9, 2024

(30) Foreign Application Priority Data
Nov. 8, 2022     (JP) .................... 2022-179107

(51) Int. Cl.
*G01V 3/00*     (2006.01)
*G01R 33/385*     (2006.01)
(Continued)

(52) U.S. Cl.
CPC ... *G01R 33/56509* (2013.01); *G01R 33/3852* (2013.01); *G01R 33/5608* (2013.01)

(58) Field of Classification Search
CPC .............. G01R 33/287; G01R 33/4835; G01R 33/5608; A61B 2090/374
(Continued)

(56) References Cited

U.S. PATENT DOCUMENTS

| 4,595,879 A | 6/1986 | Lent et al. |
| 2017/0311821 A1* | 11/2017 | Ledoux ................... G06T 7/246 |

FOREIGN PATENT DOCUMENTS

| CN | 101204327 A | * | 6/2008 | ............ A61B 5/055 |
| CN | 107536609 A | * | 1/2018 | |

(Continued)

OTHER PUBLICATIONS

Feinberg, David A., et al., "Tissue Perfusion in Humans Studied by Fourier Velocity Distribution, Line Scan, and Echo-Planar Imaging", Magn. Reson. Med., vol. 16, No. 2, pp. 280-293 (1990).
(Continued)

*Primary Examiner* — Walter L Lindsay, Jr.
*Assistant Examiner* — Frederick Wenderoth
(74) *Attorney, Agent, or Firm* — Paul Teng

(57) ABSTRACT

In MRI using an SE-based pulse sequence, an object is to suppress flow artifacts and acquire a flow artifact-free image regardless a velocity or a direction of blood flow. A pair of gradient magnetic field pulses are applied before and after a 180-degree pulse of the SE-based pulse sequence, and a plurality of times of imaging are performed using varying intensities of the pair of gradient magnetic field pulses. Image reconstruction is performed by performing a Fourier transformation on measurement data obtained through the plurality of times of imaging in an axial direction of the intensities of the gradient magnetic field pulses, that is, a velocity encoding direction. As a result, images can be separated for each velocity of a stationary tissue and a non-stationary component included in tissues, and an image of spins with a velocity of zero, that is, a flow artifact-free image of the stationary tissue, can be obtained.

14 Claims, 12 Drawing Sheets

(51) Int. Cl.
*G01R 33/56* (2006.01)
*G01R 33/565* (2006.01)

(58) Field of Classification Search
USPC .......................................................... 324/309
See application file for complete search history.

(56) References Cited

FOREIGN PATENT DOCUMENTS

| CN | 107536609 | | | 6/2020 | | |
|---|---|---|---|---|---|---|
| CN | 111899313 | A | * | 11/2020 | ........... | G06T 11/005 |
| JP | H09234188 | A | * | 9/1997 | | |
| WO | WO-2010143586 | A1 | * | 12/2010 | ....... | G01R 33/56518 |
| WO | WO-2013133391 | A1 | * | 9/2013 | ........... | A61B 5/0263 |
| WO | WO2022-098645 | A1 | | 5/2022 | | |

OTHER PUBLICATIONS

Chen, Quan, et al., "Nuclear Magnetic Resonance Imaging for Studies of Flow and Transport in Porous Media", J. Environ. Quality, vol. 31, No. 2, pp. 477-486 (2002).
Tian, Qiyuan, et al., "Generalized diffusion spectrum magnetic resonance imaging (GDSI) for model-free reconstruction of the ensemble average propagator", NeuroImage, vol. 189, pp. 497-515 (2019).
European search report dated Jun. 24, 2024 in connection with European Patent Application No. 23 20 4252.
European search report (dated Mar. 22, 2024 ) in connection with European Patent Application No. 23 20 4252.
Feinberg, D.A., et al., "Tissue Perfusion in Humans Studied by Fourier Velocity Distribution, Line Scan, and Echo-Planar Imaging", Magn Reson Med, 16: 280-93 (1990).
Chen, Q., et al., "Nuclear Magnetic Resonance Imaging for Studies of Flow and Transport in Porous Media", J Environ Qual, 31(2):477-86 (2002).

* cited by examiner

FIG. 9

IMAGING CONDITION SETTINGS

215

IMAGING PARAMETER SETTINGS

R-factor

VELOCITY ENCODING (kv)
        REQUIRED ●
        NOT REQUIRED ○

NUMBER OF kv ENCODINGS [ ] TIMES kv ENCODING AXIS
    kp ○
    kr ●
    ks ●

MAGNETIC RESONANCE IMAGING APPARATUS AND CONTROL METHOD OF THE SAME

CROSS-REFERENCE TO RELATED APPLICATION(S)

The present application claims priority from Japanese patent application JP-2022-179107 filed on Nov. 8, 2022, the content of which is hereby incorporated by reference into this application.

BACKGROUND OF THE INVENTION

1. Field of the Invention

The present invention relates to a magnetic resonance imaging apparatus (hereinafter, referred to as an MM apparatus), and more particularly, to control of a pulse sequence for measuring a nuclear magnetic resonance signal in the MRI apparatus.

2. Description of the Related Art

In an MRI apparatus, nuclear magnetic resonance signals generated from an examination target are collected through nuclear magnetic resonance, and the examination target is imaged. The nuclear magnetic resonance signals are collected by operating pulse sequences that determine the application intensity and the application order of RF pulses for exciting nuclear spins of atoms (usually protons) constituting the tissues of the examination target, gradient magnetic field pulses for adding position information to the nuclear magnetic resonance signals, and the like.

One of the typical pulse sequences used in the MRI apparatus is a spin echo-based (SE-based) pulse sequence for measuring the nuclear magnetic resonance signals generated as spin echoes (echo signals) using excitation pulses (90-degree pulse) and a 180-degree pulse, and this sequence is often used to acquire MR images.

In imaging using the SE-based pulse sequence, the nuclear spins contained in blood flowing through an imaging cross-section undergo a phase change different from the nuclear spins from stationary tissues within the imaging cross-section depending on the flow velocity, and this leads to the generation of flow artifacts along a phase encoding direction in a reconstructed image. As techniques for suppressing such flow artifacts, generally, a technique for adding flow compensation pulses for canceling out the phase change of fluid spins at a point in time of collecting the echo signal, a technique for applying pre-saturation pulses for saturating spins in neighboring regions outside an imaging target region in advance to suppress the signals, and the like are widely used.

In addition, CN107536609C has proposed a technology for preventing interference caused by blood or the like excited in one cross-section flowing into the next cross-section and affecting image formation of the next cross-section by increasing an excitation thickness of any one of a 90-degree pulse or a 180-degree pulse included in an SE-based pulse sequence to reduce flow artifacts (CN107536609C).

SUMMARY OF THE INVENTION

However, since the blood flowing through the imaging cross-section differs in the velocity and the flow direction depending on whether it is arterial blood or venous blood, and the velocity also differs depending on the thickness of blood vessels, the conventional technology described above cannot sufficiently suppress the influences (flow artifacts caused by both the factors. For example, even in a case where the intensity of the flow compensation pulses (or the crusher pulses) or the like is adjusted, the blood flow in the artery cannot be completely suppressed, which remains a source of artifacts.

An object of the present invention is to provide a technology for suppressing a flow artifact without depending on a velocity or a direction of blood flow.

In order to achieve the above-described object, the present invention enables acquisition of an image separated for each velocity by adding information for encoding a velocity of a non-stationary tissue to measurement data and performing Fourier transformation for a velocity encoding axis. As a result, it is possible to acquire an image reconstructed with a signal from a tissue with a velocity of zero, that is, a stationary tissue, without including a signal from a fluid such as blood.

That is, according to an aspect of the present invention, there is provided an MRI apparatus comprising: a measurement unit configured to apply a high-frequency pulse and a gradient magnetic field pulse for exciting a predetermined cross-section of an examination target to collect a nuclear magnetic resonance signal generated from the predetermined cross-section; a measurement controller configured to control the measurement unit such that the measurement unit collects measurement data for image reconstruction using a spin echo-based pulse sequence; and an image generation unit configured to reconstruct an image of the examination target using the measurement data consisting of the nuclear magnetic resonance signal collected by the measurement unit. The measurement controller is configured to perform control of adding a pair of gradient magnetic field pulses before and after a 180-degree pulse included in the spin echo-based pulse sequence, and using varying intensities of the pair of gradient magnetic field pulses to collect the measurement data for image reconstruction including the intensities as information for encoding a velocity of a non-stationary portion included in the examination target, and the image generation unit is configured to perform a Fourier transformation on the measurement data for image reconstruction in an encoding direction of the velocity and reconstruct the image.

In addition, according to another aspect of the present invention, there is provided a control method of a magnetic resonance imaging apparatus including a high-frequency magnetic field generation unit configured to generate a high-frequency magnetic field to be applied to an examination target, a gradient magnetic field generation unit configured to generate gradient magnetic fields in three axial directions in a space where the examination target is placed, a measurement unit configured to collect a nuclear magnetic resonance signal generated from the examination target, and an image generation unit configured to generate an image from measurement data consisting of the nuclear magnetic resonance signal collected by the measurement unit.

The control is performed as follows: as a pulse sequence, a spin echo-based pulse sequence including application of a 90-degree pulse and a 180-degree pulse and used to measure a spin echo from a predetermined cross-section of the examination target is used; a pair of gradient magnetic field pulses are applied to at least one axis of three axes of the gradient magnetic fields before and after the 180-degree pulse; varying intensities of the pair of gradient magnetic field pulses are used to collect measurement data for image reconstruction including the intensities as information for encoding a velocity of a non-stationary portion included in the examination target; and a Fourier transformation is performed on the measurement data for image reconstruction in an encoding direction of the velocity and an image is reconstructed.

According to the present invention, the pair of gradient magnetic field pulses are added and measurements are performed using varying intensities thereof, so that information for encoding the velocity can be imparted to the measurement data, and an image of the stationary tissue in which a signal from a non-stationary tissue having a velocity is excluded, that is, a flow artifact-free image, can be obtained.

BRIEF DESCRIPTION OF THE DRAWINGS

FIG. 9 is a diagram showing an example of a display screen of a UI unit.

DESCRIPTION OF THE PREFERRED EMBODIMENTS

Hereinafter, embodiments of an MRI apparatus according to the present invention will be described.

Figure 1:
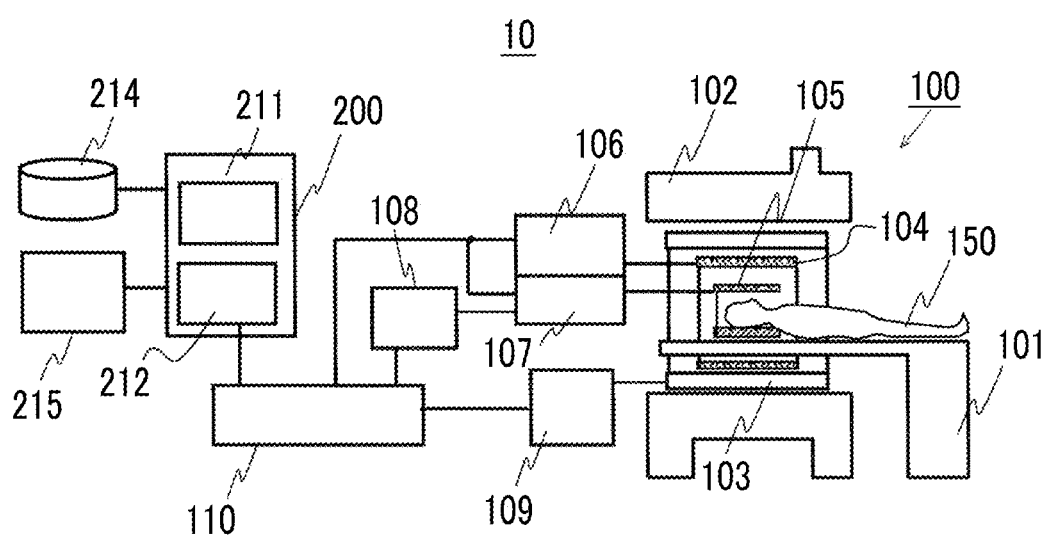
FIG. 1 is a diagram showing an overall configuration of an MRI apparatus.

First, an outline of the MRI apparatus to which the present invention is applied will be described. As shown in FIG. 1, an MRI apparatus 10 comprises, as a measurement unit 100, a static magnetic field generating magnet 102, a gradient magnetic field coil 103 that provides a magnetic field gradient to a static magnetic field, an RF transmission coil 104 that irradiates a subject 150 in a static magnetic field space with a high-frequency magnetic field, an RF reception coil 105 that receives a nuclear magnetic resonance signal generated from the subject 150, an RF transmission unit 106 that supplies a high-frequency pulse current to the RF transmission coil 104, a signal processing unit 108 that performs signal processing by detecting an NMR signal received by the RF reception coil 105, and a gradient magnetic field power supply 109 that supplies a current to the gradient magnetic field coil 103. The subject 150 is disposed in the static magnetic field space generated by the static magnetic field generating magnet 102 while lying down on an examination table 101.

In addition, the MM apparatus comprises, as a control/computation system, a measurement controller 110 that controls operations of an RF transmission unit 107, the signal processing unit 108, and the gradient magnetic field power supply 109, a computer 200 provided with a CPU 211, a memory 212, an internal storage device (not shown), and the like, an external storage device 214 connected to the computer 200, and a user interface (UI) unit 215 including a display device, an input device, and the like. The computer 200 may also be connected to an external network such as the Internet or intranet via a network IF (not shown).

The static magnetic field generating magnet 102 comprises a static magnetic field generating source of a permanent magnet type, a normal conduction type, or a super-conduction type, and there are a vertical magnetic field type, a horizontal magnetic field type, and the like depending on the direction of the static magnetic field to be generated. The present invention can be applied to any type of static magnetic field generating magnet.

The gradient magnetic field coil 103 is coils wound in three axes directions, that is, X, Y, and Z, which is a real-space coordinate system (static coordinate system) of the MRI apparatus, and a gradient magnetic field pulse can be applied in a desired direction by supplying a pulsed current from the gradient magnetic field power supply 109 to each of the gradient magnetic field coils. Position information is imparted to the NMR signal in response to the application of the gradient magnetic field. Specifically, for example, in a case of imaging a two-dimensional cross-section (slice), a slice position is determined by applying the gradient magnetic field in a slice direction. The NMR signal to be generated can be encoded in each direction by applying the gradient magnetic field pulse in each direction in a state in which this slice position is excited, with one direction of two directions perpendicular to a slice plane as a phase encoding direction and the other direction as a readout direction. Since the NMR signal is usually collected as an echo signal of the RF pulse or the gradient magnetic field pulse, the NMR signal is also hereinafter referred to as an echo signal.

The RF transmission coil 104 generates a pulsed induced magnetic field (RF pulse) using a high-frequency pulse current supplied from the RF transmission unit 106. As a result, the nuclear spins of the atoms constituting the tissues of the subject 150 are excited to generate the NMR signal. The RF reception coil 105 detects the echo signal from the subject 150 and sends the echo signal to the signal processing unit 108. The signal processing unit 108 performs quadrature detection of the echo signal and performs A/D conversion to generate time-series digital data, thereby generating measurement data for image reconstruction.

The intensities and timings of the RF pulse and the gradient magnetic field pulse of each axis, the timing of signal collection (sampling), and the like are determined in advance as pulse sequences for each imaging and are set in the measurement controller 110. The measurement controller 110 calculates a pulse sequence to be used for imaging by using the set pulse sequence, and imaging conditions and imaging parameters set by a user via the UI unit 215, and controls the RF transmission unit 106, the gradient magnetic field power supply 109, and the signal processing unit 108 in accordance with the imaging sequence. As a result, the measurement data necessary for the image reconstruction of the subject 150 can be collected.

In the MM apparatus of the present embodiment, an SE-based pulse sequence is set in the measurement controller 110 as the pulse sequence. The measurement controller 110 controls the measurement unit 100 to add, to the set SE-based pulse sequence, the gradient magnetic field pulses for imparting velocity information to the echo signal and to repeat measurements with varying intensities of the gradient magnetic field pulses.

The computer 200 functions as an overall controller that controls the entire apparatus including the measurement unit 100 and the measurement controller 110, and also functions as a computation unit that performs various computations such as image reconstruction using the measurement data. Therefore, the computer 200 comprises an image generation unit that reconstructs an image by performing a Fourier transformation on the measurement data, a memory 212 or an internal storage unit for storing data necessary for the computation of the image generation unit, data in the middle of processing, and the like.

The image generation unit uses the measurement data obtained by repeating the measurements while changing the intensity of the gradient magnetic field pulse by using the SE-based pulse sequence, to which the gradient magnetic field pulse is added, to generate an image of only the signal from spins with a velocity of zero in the tissues of the subject, which is a measurement target, that is, an image of stationary tissues.

The computer 200 displays the image, a computation result, or the like, which is a processing result of the image generation unit, on a display of the UI unit 215, stores the processing result in the external storage device 214, or transfers the processing result via a network as necessary. The user can send commands and instructions necessary for processing of the computer 200, in addition to settings of the imaging parameters, via the UI unit 215.

The measurement unit 100 of the MRI apparatus 10 of the present embodiment performs imaging using the SE-based pulse sequence under the control of the measurement controller 110. In this case, the measurement controller 110 controls the measurement unit 100 to add a pair of gradient magnetic field pulses before and after a 180-degree pulse included in the pulse sequence and to perform a plurality of times of imaging with varying intensities of the pair of gradient magnetic field pulses. The pair of gradient magnetic field pulses are added to at least one of three axes: a slice axis (Gs); a phase encoding axis (Gp); and a readout axis (Gr).

In the SE-based pulse sequence, at a point in time (TE) of measuring the echo signal, the gradient magnetic field of each axis is applied such that the phase of spins excited within the imaging cross-section returns to its original phase. However, by applying the pair of gradient magnetic field pulses, the phase of spins in stationary tissues present within the imaging cross-section returns to its original state, whereas the phase of spins of fluids (non-stationary tissues) such as blood changes depending on the received gradient magnetic field, and this change is dependent on the velocity of the fluid (the velocity along the axis of the applied gradient magnetic field pulse). Although the signal measured after receiving the history of application of the gradient magnetic field pulse is obtained as a sum of spins from the stationary tissues and spins with various velocities, information on the gradient magnetic field pulse intensity is imparted to each of the measurements with different intensities of the gradient magnetic field pulses. That is, in a case where pieces of measurement data obtained in the measurements with different intensities are arranged along the axis of the intensities of the gradient magnetic field pulses, the axis of the intensity can be considered as an encoding axis, similarly to the phase encoding axis. This axis is called a velocity encoding axis (kv axis) in the present specification.

An image generation unit 220 of the present embodiment uses a plurality of pieces of measurement data acquired with varying intensities of the pair of gradient magnetic field pulses as measurement data to which velocity encoding is imparted, and performs a Fourier transformation in a velocity encoding axis direction. As a result, an image in which the velocity is separated is obtained. That is, an image of tissues with a velocity of zero, which is free from the signal of tissues with the velocity, that is, which is free from flow artifacts, is obtained.

As described above, the present invention enables the acquisition of the flow artifact-free image by performing control of applying the pair of gradient magnetic field pulses before and after the 180-degree pulse, performing a plurality of times of imaging with varying intensities of the pair of gradient magnetic field pulses, performing image reconstruction by performing a Fourier transformation in the axial direction of the intensities of the gradient magnetic field pulses, that is, the velocity encoding direction, on the measurement data obtained through the plurality of times of imaging.

Hereinafter, a specific pulse sequence and a specific embodiment of the image reconstruction technique will be described. In the following embodiments, FIG. 1 showing the entire MM apparatus is common, and the description will be made with reference to FIG. 1 as appropriate.

Embodiment 1

Figure 2:
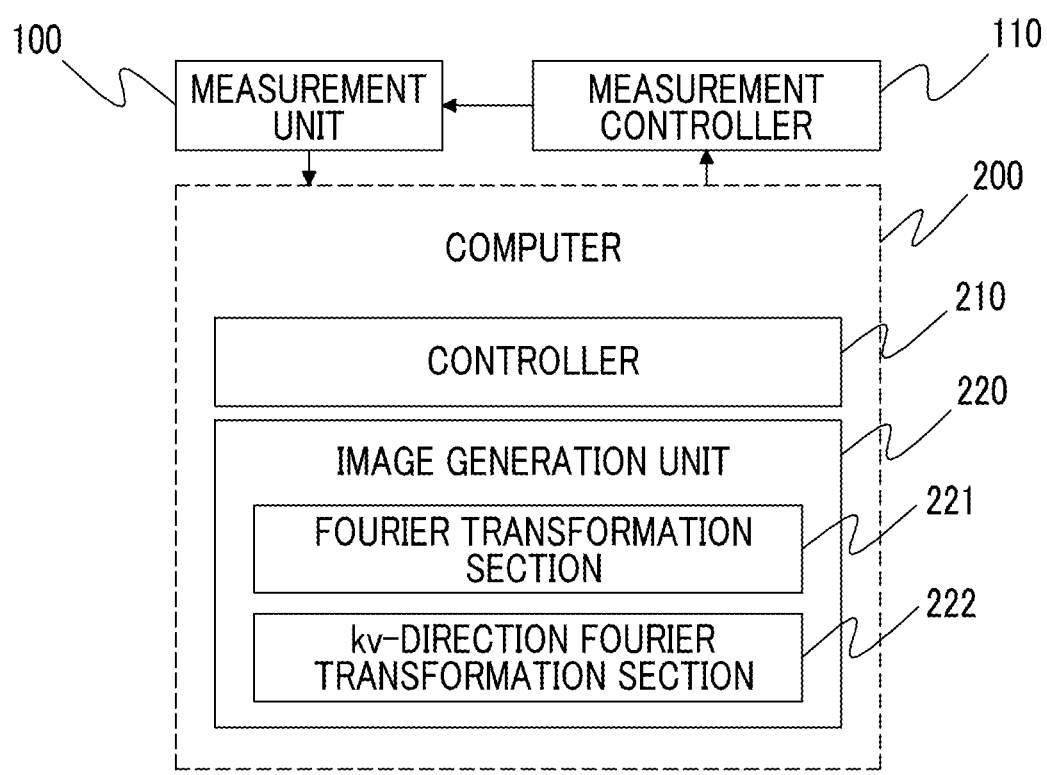
FIG. 2 is a functional block diagram of a computer of the MRI apparatus of Embodiment 1.

An outline of the computer 200 of the present embodiment is shown in FIG. 2. As shown in the drawing, in the MRI apparatus of the present embodiment, as a function of the computer 200, a controller 210 that controls the entire apparatus and the image generation unit 220 are provided, and the image generation unit 220 includes a Fourier transformation section 221 that performs a Fourier transformation on the measurement data measured by the measurement unit 100 and that generates real-space data, and a kv-direction Fourier transformation section 222 that performs a Fourier transformation in the velocity encoding direction (kv direction), which will be described below.

Figure 3:
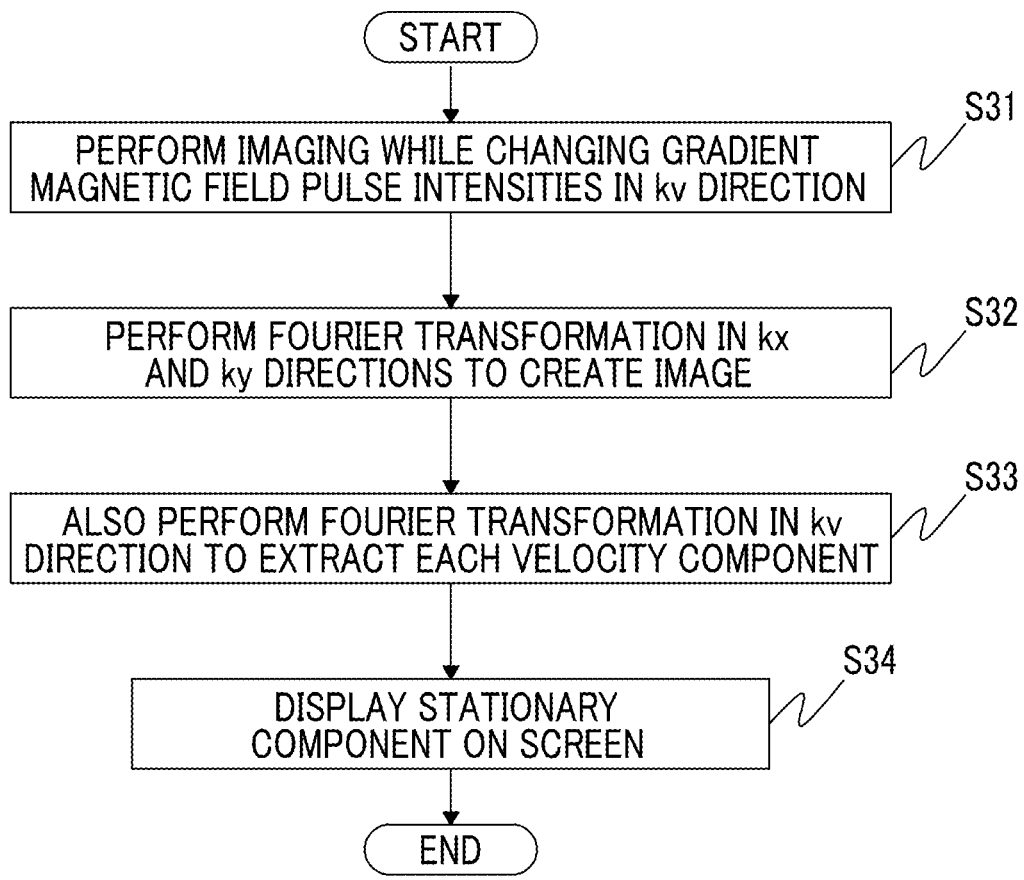
FIG. 3 is a flowchart showing an operation of the MRI apparatus of Embodiment 1.

Hereinafter, a flow of measurement control of the present embodiment will be described with reference to the flows of FIGS. 2 and 3.

Imaging: S31

Figure 4:
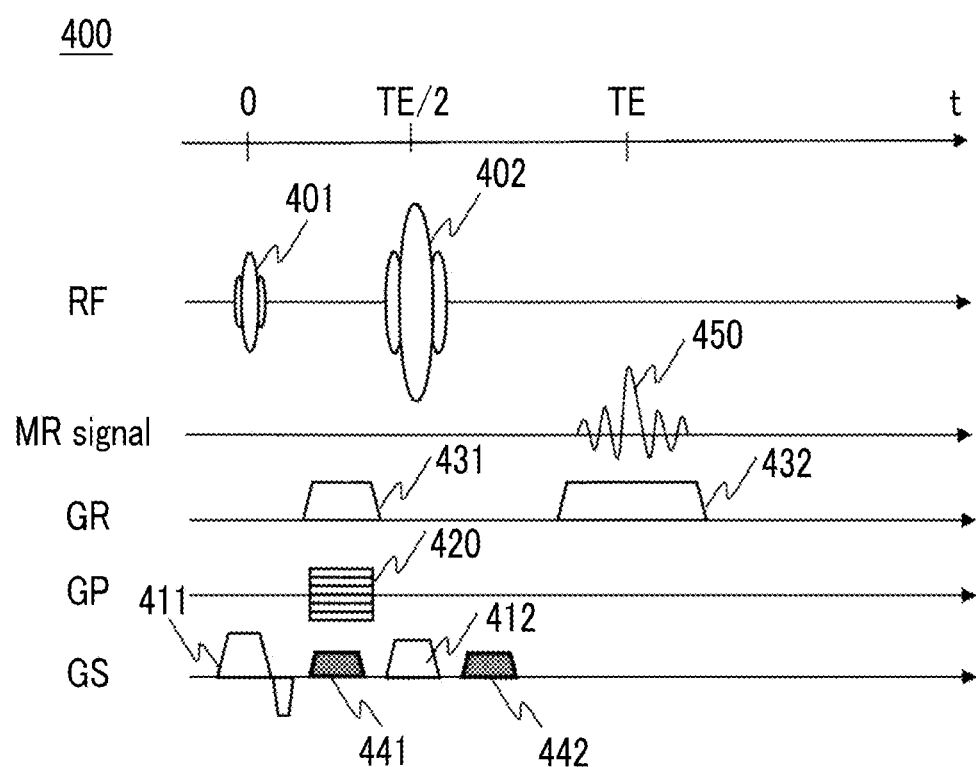
FIG. 4 is a diagram showing an example of a 2D-SE-based sequence of Embodiment 1.

After the pulse sequence to be used for imaging is determined, the measurement controller 110 operates each unit including the transmission unit, the gradient magnetic field generation unit, and the reception unit to start imaging. In the present embodiment, an SE-based pulse sequence 400 as shown in FIG. 4 is used.

This pulse sequence is the same as a general 2D-SE-based pulse sequence except that a pair of gradient magnetic field pulses are added to one gradient magnetic field axis.

That is, first, an excitation RF pulse (90-degree pulse) 401 is applied, and after a predetermined time (TE/2) has elapsed, a 180-degree pulse 402 for inverting the magnetization is applied, thereby generating a spin echo (echo signal 450) that peaks at the echo time (TE). In a case where the 90-degree pulse 401 and the 180-degree pulse 402 are applied, slice gradient magnetic field pulses 411 and 412 for selecting the cross-sections to be simultaneously excited are applied, respectively. After that, a gradient magnetic field pulse 420 in the phase encoding direction is applied to impart position information in the phase encoding direction to the echo signal, and then a gradient magnetic field pulse 432 in a readout direction is applied to collect the echo signal 450 for a predetermined time. A gradient magnetic field pulse 431 is a dephasing gradient magnetic field.

A pair of gradient magnetic field pulses 441 and 442 are added before and after the application of the 180-degree pulse 402. FIG. 4 shows a case where the gradient magnetic field pulses 441 and 442 are applied to the slice axis as an example, but the axis to which the pair of gradient magnetic field pulses 441 and 442 are applied may be any of the three gradient magnetic field axes, and may be one or more axes.

Since the pair of gradient magnetic field pulses 441 and 442 have the same polarity and magnitude and are applied before and after the 180-degree pulse 402, spins from motionless tissues that undergo a phase change (dephasing) due to the application of the gradient magnetic field pulse 441 return to the original state (rephasing) in response to the application of the gradient magnetic field pulse 442 and are not affected by the application of these gradient magnetic field pulses. On the other hand, in spins from fluids or the like, a difference occurs between the dephasing and the rephasing, and the difference varies depending on the velocity of the fluid. That is, a phase change φ (v) of spins moving at a velocity v up to the echo time is represented by Equation (1A). In Equation (1A), G(t) represents the gradient magnetic field pulse intensity, x(t) represents the position in the x direction, t represents the time, and γ represents the Larmor frequency.

$$\phi(v) = \gamma \int_0^{TE} G(t)x(t)dt \quad (1A)$$

$$= \gamma \int_0^{TE} G(t)(x_0 + vt)dt \quad (1B)$$

$$= \gamma v \int_0^{TE} G(t)t\, dt \quad (1C)$$

$$= \gamma v k_v \quad (1D)$$

Since a case where the initial position of x(t) is denoted by x0 is represented by x0=x0+vt, Equation (1A) becomes Equation (1B). Since there is no phase change in the stationary portion and G(t)×0, which is the phase change of the stationary portion, is zero, Equation (1B) further becomes Equation (1C). In a case where the G(t) integral of Equation (1C) is expressed by kv, Equation (1C) is represented as Equation (1D). That is, the phase change (v) of the fluids moving at the velocity v is a linear function of the velocity.

The measurement controller 110 repeats such a sequence 400 for a predetermined repetition time TR while changing the application intensity of the gradient magnetic field pulse 420 in the phase encoding direction, and collects the number of echo signals necessary for image reconstruction. The echo signals obtained through this repetition are disposed in a k space (kx-ky space).

Figure 5B:
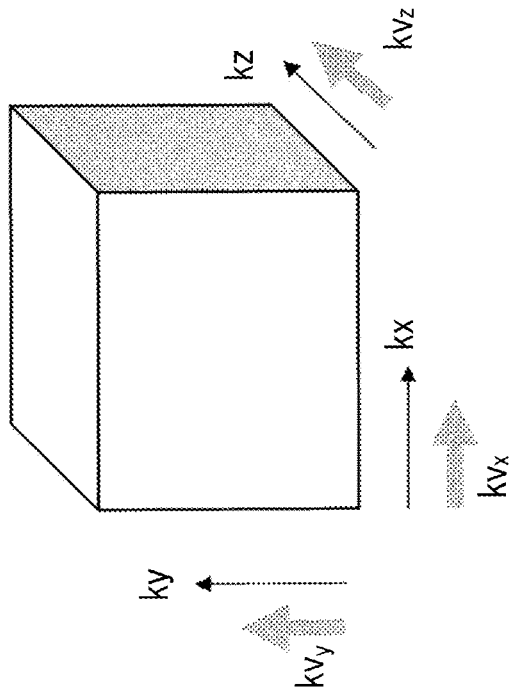
FIGS. 5A and 5B are diagrams illustrating k-space data of Embodiment 1 and Modification Example 1 thereof.
Figure 5A:
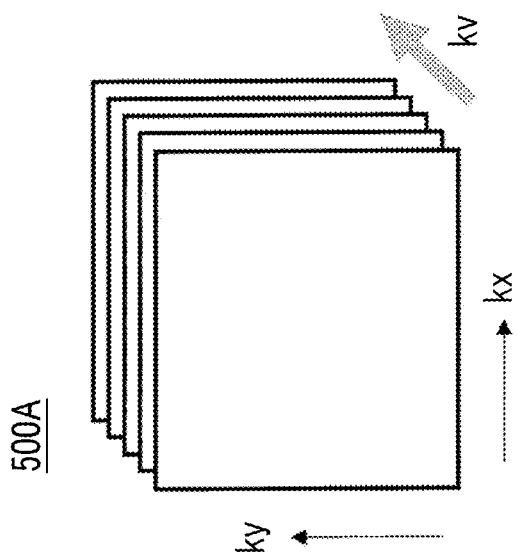

The measurement controller 110 performs the same measurement as described above with varying intensities of the gradient magnetic field pulses 441 and 442 and obtains pieces of k-space data with different conditions of the intensities of the gradient magnetic field pulses 441 and 442. A plurality of measurements with varying intensities of the gradient magnetic field pulses are performed. As a result, as shown in FIG. 5A, measurement data 500A consisting of a plurality of pieces of k-space data arranged in a direction (kv direction) of the intensities of the gradient magnetic field pulses as an axis is obtained.

The number of measurements with varying intensities of the gradient magnetic field pulses is not particularly limited but is, preferably, three or more times, for example. In order to prevent an increase in measurement time, the number of measurements is preferably five or fewer times.

Image Reconstruction: S32 and S33

The image generation unit 220 performs image reconstruction using the measurement data 500A. Therefore, in the present embodiment, first, the Fourier transformation section 221 performs a 2D-Fourier transformation on each piece of k-space data of the measurement data 500A to generate image data (S32). This processing is the same as the image reconstruction using a general Fourier transformation.

Figure 6:
FIG. 6 is a diagram showing an image generated from measurement data obtained through measurements with varying intensities of gradient magnetic field pulses.
Figure 7:
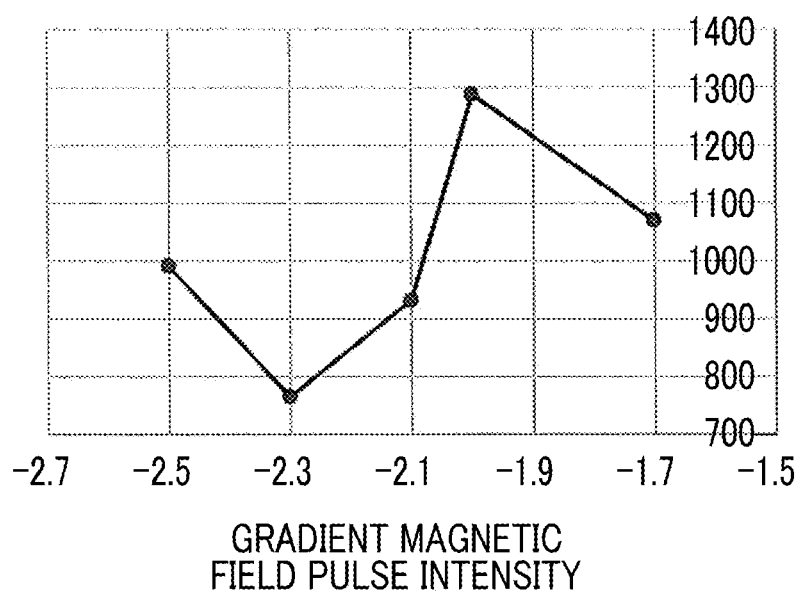
FIG. 7 is a graph showing a relationship between a signal intensity of the image of FIG. 6 and the gradient magnetic field pulse intensity.

FIG. 6 shows an example of the image data obtained in this manner. Five images shown in FIG. 6 are images obtained by imaging a cross-section of the brain and are images obtained through the measurement with varying intensities of the gradient magnetic field pulses. In these images, the signal of the artery located at the position indicated by a circle attached near the brain surface appears as a flow artifact at the position indicated by a circle attached near the center of the brain parenchyma. However, the intensity of the signal appearing as an artifact differs depending on the image (depending on the intensity of the gradient magnetic field pulse) and exhibits behavior such as vibration as shown in FIG. 7. That is, it is possible to suppress the artifact to some extent by adjusting the intensity of the gradient magnetic field pulse, but on the contrary, the artifact increases depending on the adjustment method.

The signal of each image is obtained as the sum of the signals from spins of the stationary tissues present inside the tissues of the measurement slice and spins of blood flow and the like having various velocities, and can be represented by Equation (2A). Here, in a case where "φ" in Equation (2A) is substituted with the right side of Equation (1D) described above, Equation (2A) becomes Equation (2B).

$$S(x, y, v) = \int_{-\infty}^{\infty} |S(x, y, v)|e^{i\phi}dv \quad (2A)$$

$$= \int_{-\infty}^{\infty} |S(x, y, v)|e^{i\gamma v k_v}dv \quad (2B)$$

Equation (2B) shows that v and kv are in a Fourier transformation relationship.

Figure 8:
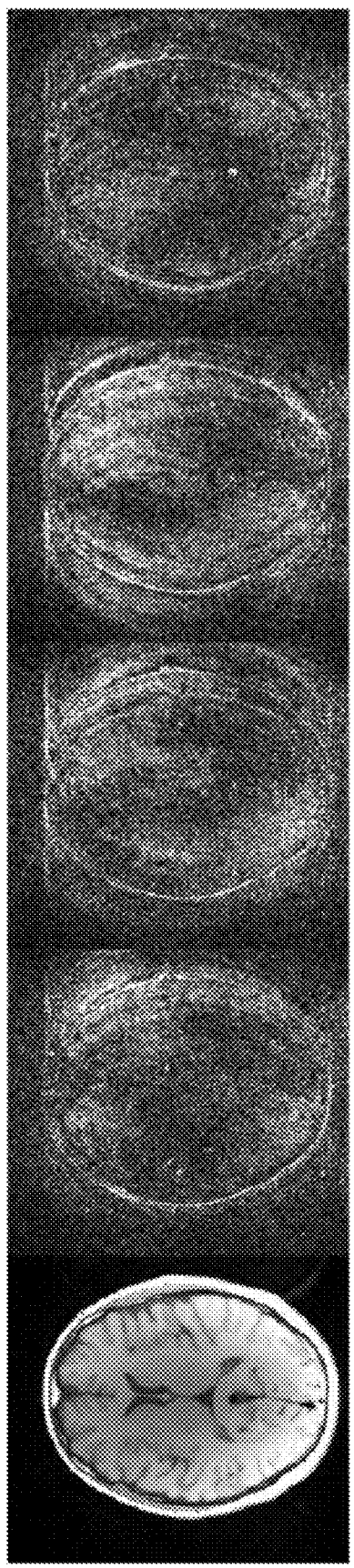
FIG. 8 is a diagram showing an image after a Fourier transformation of the image of FIG. 6 in a velocity encoding direction.

The kv-direction Fourier transformation section 222 performs a Fourier transformation in the kv direction on the image data after transformation by the Fourier transformation section 221. As a result, the image for each v can be generated. FIG. 8 shows an image obtained by performing a Fourier transformation on each image of FIG. 6 in the kv direction. The leftmost image of FIG. 8 is the image with a velocity of zero, that is, the image of the stationary tissues. In FIG. 8, it should be noted that the leftmost image and the four images on the right side are displayed with different scales in order to make it easier to understand the signal of the spins having the velocity. In this way, the image data obtained in all the measurements is subjected to the Fourier transformation in the kv direction, so that the signals are concentrated at a velocity of zero, and the other images become images with substantially zero signals.

Image Display: S34

The computer 200 displays a zero-velocity image generated by the image generation unit 220 on a display device such as a display of the UI unit 215. Alternatively, the zero-velocity image is transferred to another device or the external storage device 214.

According to the present embodiment, a pair of gradient magnetic field pulses are added before and after the 180-degree pulse of the SE-based pulse sequence, a plurality of measurements with varying intensities of the gradient magnetic field pulses are performed, and a Fourier transformation is performed on the obtained measurement data in the axial direction of the intensities of the gradient magnetic field pulses, so that images can be separated for each velocity, and a zero-velocity image can be generated.

Modification Example of Embodiment 1

In Embodiment 1, a case where a pair of gradient magnetic field pulses are added with respect to the slice axis has been described, but the axis to which the pair of gradient magnetic field pulses are added may be another axis, that is, the phase encoding axis or the readout axis. Since the images are separated for each velocity of spins on the axis to which the pair of gradient magnetic field pulses are added, the axis can be appropriately selected in consideration of an imaging target part or the slice direction. It is also possible to add a gradient magnetic field not only to one axis but also to two or three axes.

For this purpose, a configuration may also be employed in which a user designation of the axis to which the gradient magnetic field pulses are added is accepted via the UI unit 215. FIG. 9 shows an example of a screen displayed on the display of the UI unit 215. In this example, for example, on an imaging parameter setting screen for setting TR, TE, R-factor (thinning-out rate), and the like, a GUI that is used for the user to designate the necessity for velocity encoding is provided, and in a case where "required" is selected for the velocity encoding, a block for inputting the number of measurements with varying intensities of the gradient magnetic fields, a block for designating the application axis of the gradient magnetic field, and the like are displayed. Further, a GUI for inputting information regarding the intensity of the gradient magnetic field and information regarding thinning out such as phase encoding may be added. The user can freely set the number of measurements or the application axis via such a GUI.

Further, in Embodiment 1, a case where image reconstruction is performed through two stages of processing: processing of the Fourier transformation section 221; and processing of the kv-direction Fourier transformation section 222, on the measurement data (FIG. 5A: 500A) consisting of the plurality of pieces of k-space data, has been described, but it is also possible to obtain images separated for each velocity by performing a 3D-Fourier transformation all at once.

Further, the following modification examples are possible.

Modification Example 1: Modification Example of Pulse Sequence

Figure 10:
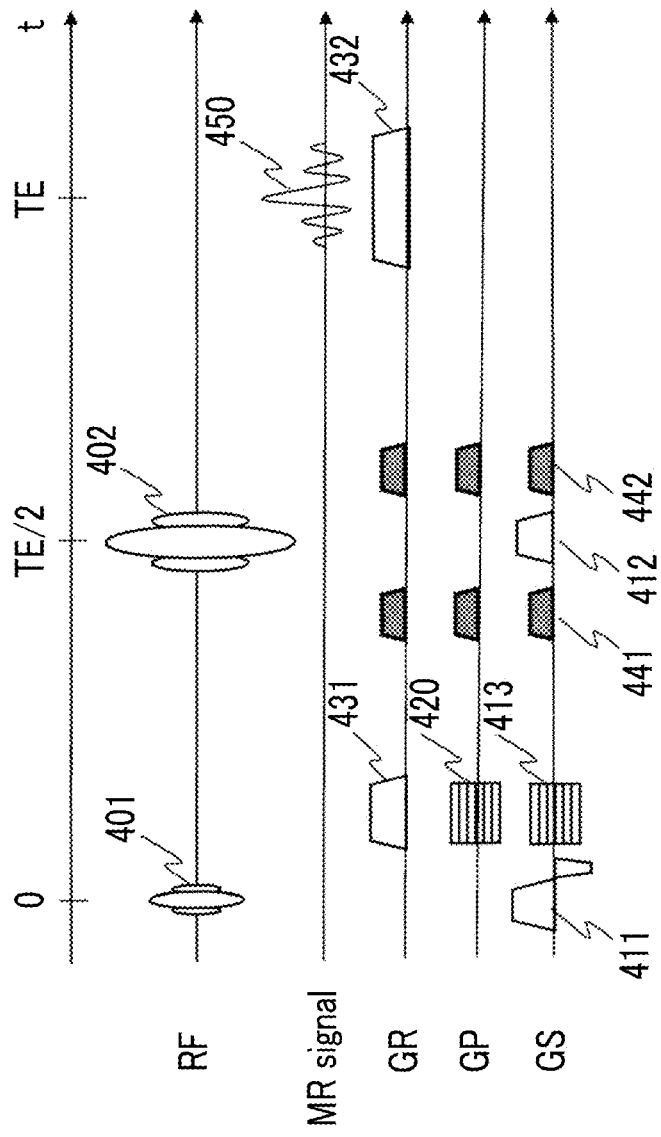
FIG. 10 is a diagram showing an example of a 3D-SE-based sequence of Modification Example 1 of Embodiment 1.

Further, in Embodiment 1, the 2D-SE-based pulse sequence is used, but it is also possible to perform 3D imaging using a 3D-SE-based pulse sequence 400B as shown in FIG. 10. In the drawing, the same elements as those of the pulse sequence of FIG. 4 are indicated by the same reference numerals. The 3D-SE-based pulse sequence is a pulse sequence to which an encoding gradient magnetic field 413 is also added in the slice direction (GS). In the shown example, the pair of gradient magnetic field pulses 441 and 442 are added before and after the 180-degree pulse 402 for each of the three gradient magnetic field axes, that is, GR, GP, and GS. The intensities of the gradient magnetic field pulses of the respective axes may be the same or different. A plurality of measurements with varying intensities of the gradient magnetic field pulses of each axis are performed to obtain 3D-k-space data 500B as shown in FIG. 5B. Although only one piece of 3D-k-space data is shown in FIG. 5B, the same number of pieces of 3D-k-space data as the number of measurements is obtained.

In the image generation unit 220, first, the Fourier transformation section 221 converts the 3D-k-space data into image space data by performing, for example, a 3D Fourier transformation, and then the kv-direction Fourier transformation section 222 performs a Fourier transformation on each image space data in the kv direction, thereby generating images separated in the velocity direction. The Fourier transformation in the kv direction may also be performed for each of the three kv axes, or a 3D-Fourier transformation may be performed all at once.

In a case where the gradient magnetic field pulses are added to the plurality of axes in this way, it is possible to obtain an image excluding the flow artifacts from the blood vessels with various velocities flowing in various directions.

Modification Example 2: Modification Example of Sampling

In Embodiment 1, a case where full sampling is performed for the phase encoding for each of the measurements with varying intensities of the gradient magnetic field pulses has been described, but it is also possible to thin out phase encoding for each kv encoding, that is, for each measurement of the plurality of measurements with varying intensities of the pair of gradient magnetic field pulses. There are several image reconstruction methods from the measurement data collected by thinning out the phase encoding, but in the present modification example, in order to perform the same processing as that of Embodiment 1, sampling is performed such that phase encoding necessary for the image reconstruction is collected across the plurality of measurements.

Figure 11A:
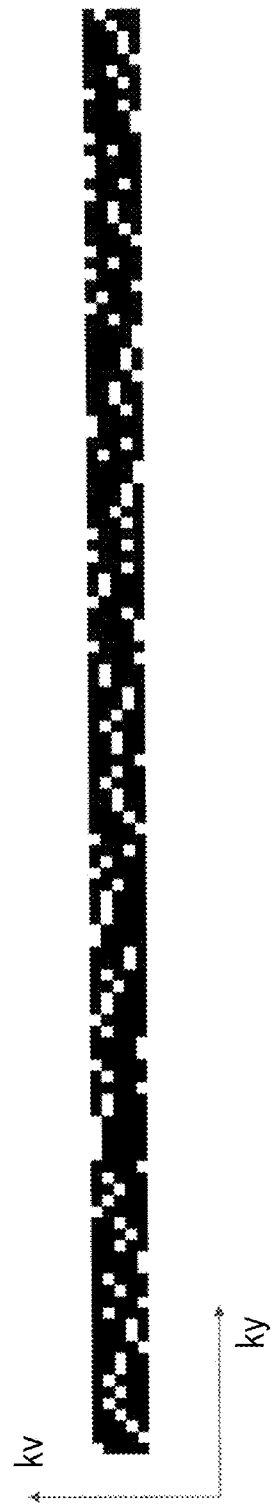
FIGS. 11A and 11B are each a diagram showing an example of k-space sampling of Modification Example 2 of Embodiment 1.
Figure 11B:
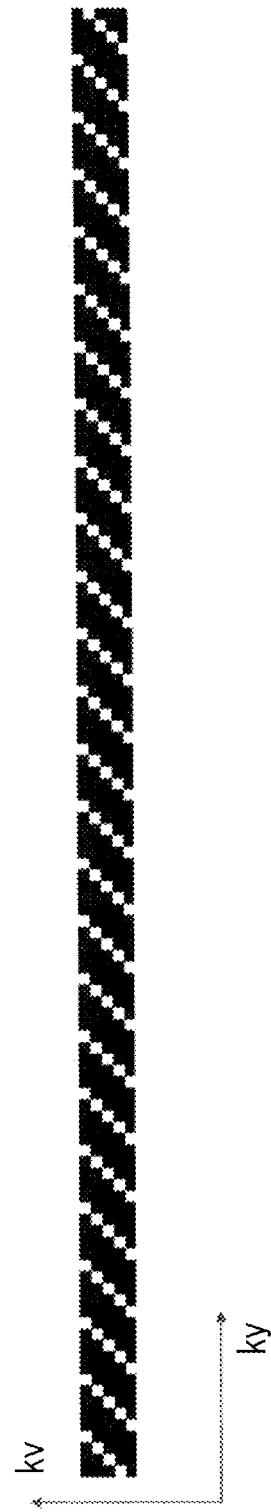

FIGS. 11A and 11B show sampling examples of the present modification example. FIGS. 11A and 11B each show a kv-ky space and show a case where the number of encodings of kv is five as an example. Further, in the drawings, the white part represents data to be measured, and the black part is data that is not measured. As shown in the drawings, the phase encoding is thinned out in each kv, but all pieces of phase encoding data are collected across all five kv values. That is, the number of samplings across all the measurements is a predetermined number of phase encodings, and there is no extension of the imaging time. In the measurement data obtained through such measurements, the kx-ky data for each measurement is insufficient data or thinned-out data. However, in the same manner as in Embodiment 1, in a case where a Fourier transformation is performed in a kx-ky direction and a Fourier transformation is further performed in the kv direction, the signals are concentrated at a velocity of zero as in the image on the right side of FIG. 8, and an image that does not exhibit folding and is free from flow artifacts is obtained.

FIG. 11A shows an example of random undersampling in the phase encoding direction, but in the present modification example, randomness is not essential, and for example, as shown in FIG. 11B, it is possible to employ any thinning-out method such as thinning out every 4 encodings.

According to the present modification example, it is possible to offset the increase in measurement time due to the plurality of measurements by thinning out the phase encoding, thereby achieving flow artifact removal to which the present invention is applied without causing a prolongation of the measurement time.

Embodiment 2

In Embodiment 1, the Fourier transformation is used as means for image reconstruction, but it is also possible to employ sequential reconstruction called compression sensing. The compression sensing is a technique for restoring data by repeating transformation into a sparse space and minimization of the L1 norm after sparse transformation using the sparsity of measurement data, and image reconstruction is performed with the constraint that the restored k-space data does not deviate significantly from the actually measured k-space data.

Only a small amount of non-stationary components such as blood flow are present in the stationary tissues, which results in a sparse image. The present embodiment is characterized in that compression sensing is performed by using the fact that non-stationary components are sparse.

Figure 12:
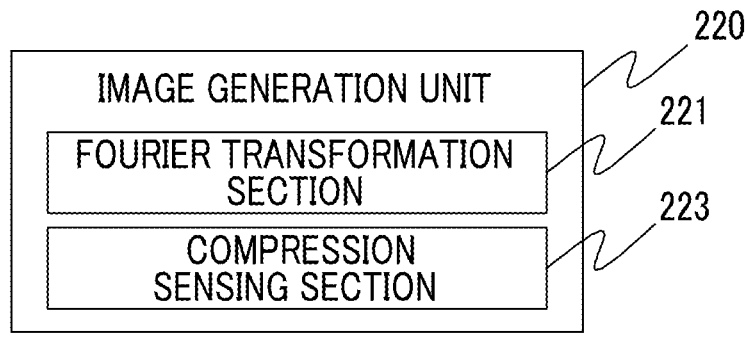
FIG. 12 is a functional block diagram of an image generation unit of Embodiment 2.
Figure 13:
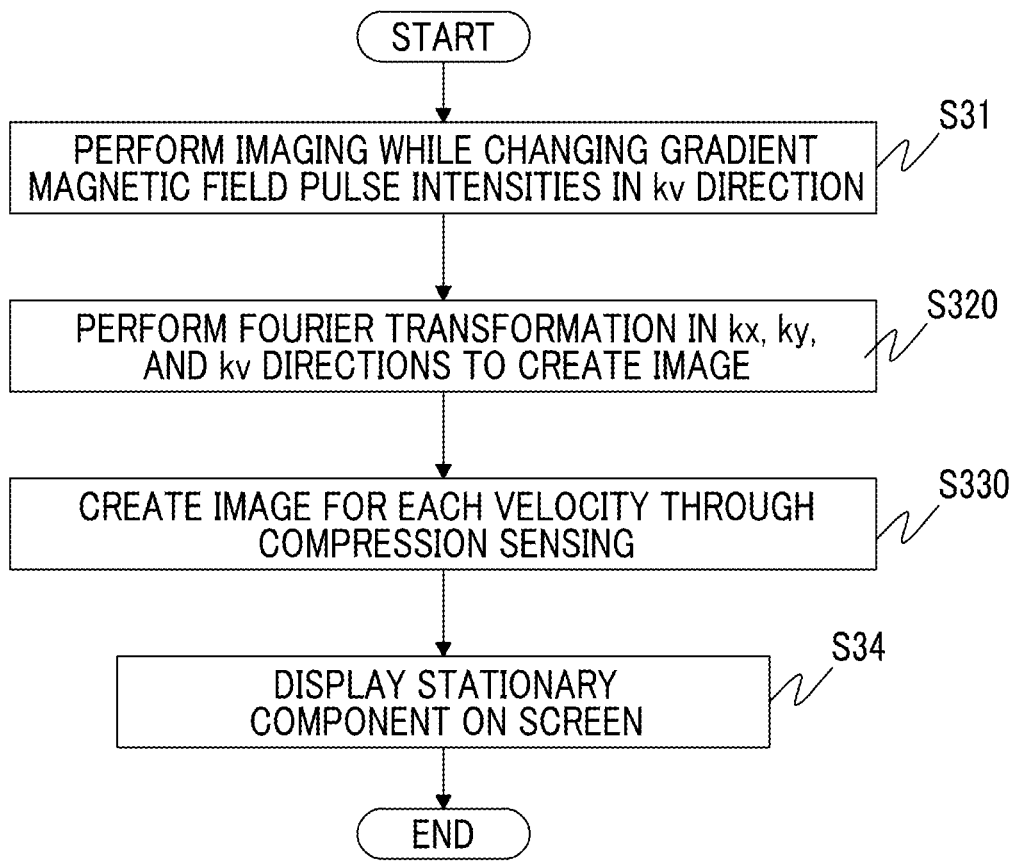
FIG. 13 is a flowchart showing an operation of an MRI apparatus of Embodiment 2.

Hereinafter, a flow of measurement control of the present embodiment will be described with reference to FIGS. 12 and 13. FIG. 12 is a functional block diagram of the image generation unit 220, and FIG. 13 is a flowchart showing a flow of measurement, and elements having the same functions as those of FIGS. 2 and 3 used in Embodiment 1 are indicated by the same reference numerals.

As shown in FIG. 12, the image generation unit 220 of the present embodiment comprises a compression sensing section 223 instead of the kv-direction Fourier transformation section 222. In the present embodiment as well, similarly to Embodiment 1, the measurement unit 100 executes the 2D or 3D SE-based pulse sequence 400 or 400B including the pair of gradient magnetic field pulses 441 and 442 shown in FIG. 4 or FIG. 10, and also performs a plurality of measurements with varying intensities of the pair of gradient magnetic field pulses 441 and 442 to acquire measurement data shown in FIG. 5A or FIG. 5B (S31).

However, in the present embodiment, the sampling in the ky-kv space is made random. ky is the phase encoding axis, and random sampling is performed by appropriately thinning out the phase encoding. Further, in order to make the sampling random, the phase encoding to be thinned out may be varied for each of the plurality of measurements with varying intensities of the gradient magnetic field pulses. In this case, phase encoding is thinned out such that data in the low frequency region of the ky axis remains as appropriate. FIG. 11A is an example of random sampling. Here, the number of phase encodings is shown to be smaller than the number of usual encodings, but the number of phase encodings is usually 256, 512, or the like. Further, a case where measurements with different intensities of the gradient magnetic field pulses are performed five times (kv is 5) is shown, and different sampling points in the phase encoding direction are thinned out for each measurement, resulting in random sampling in the ky-kv space.

First, in the image generation unit 220, the Fourier transformation section 221 performs a Fourier transformation on the measurement data in the kx, ky, and kv directions to obtain all image data (S320). The image data obtained in all the measurements is subjected to the Fourier transformation in the kv direction, so that the signals are concentrated at a velocity of zero, and the other images become images with substantially zero signals.

Next, the compression sensing section 223 restores the image by solving the optimization problem represented by Equation (3) for this zero-velocity image (S330).

$$\mathrm{argmin}(\|FI-y\|_2^2 + \lambda |I_{v=0}|_1) \quad (3)$$

In Equation (3), y represents a point in the actually measured k space, and I represents image data that has undergone a Fourier transformation in the kx, ky, and kv directions.

The zero-velocity image obtained through the compression sensing is an image that is free from the flow artifacts as in Embodiment 1, and a high-quality image similar to the sampled image without thinning-out is obtained, even from measurement data obtained through a reduced number of samplings by performing compression sensing.

According to the present embodiment, by incorporating the compression sensing, it is possible to reduce the number of samplings, mitigate the increase in the measurement time resulting from performing the plurality of measurements with varying intensities of the gradient magnetic field pulses, and improve the effectiveness of the present invention. It should be noted that the modification examples of Embodiment 1 can be applied to Embodiment 2 as they are, and these are also included in the present invention.

Although embodiments of the MRI apparatus and the control method thereof according to the present invention have been described above, the present invention is not limited to the above-described embodiments and modification examples thereof, and it is possible to add or change known elements. For example, the present invention provides a flow artifact-free image, but also provides a technology for separating measurement data according to the velocity of the non-stationary components included in tissues, and generating the image separated for each velocity of fluids is also included in the present invention.

EXPLANATION OF REFERENCES

100: measurement unit
110: measurement controller
200: computer
220: image generation unit
221: Fourier transformation section
222: kv-direction Fourier transformation section
223: compression sensing section

What is claimed is:

1. A magnetic resonance imaging apparatus comprising:
    a measurement unit configured to apply a high-frequency pulse and a gradient magnetic field pulse for exciting a predetermined cross-section of an examination target to collect a nuclear magnetic resonance signal generated from the predetermined cross-section;
    a measurement controller configured to control the measurement unit such that the measurement unit collects measurement data for image reconstruction using a spin echo-based pulse sequence, including application of a slice gradient magnetic field pulse, a phase encoding gradient magnetic field pulse and a readout gradient magnetic field pulse; and an image generation unit configured to reconstruct an image of the examination target using the measurement data consisting of the nuclear magnetic resonance signal collected by the measurement unit, wherein the measurement controller is configured to perform control of adding a pair of gradient magnetic field pulses having the same intensity and polarity, in addition to the slice gradient magnetic field pulse, the phase encoding gradient magnetic field pulse and the readout gradient magnetic field pulse, before and after a 180-degree pulse included in the spin echo-based pulse sequence, and using varying intensities of the pair of gradient magnetic field pulses to collect the measurement data for image reconstruction including the intensities as information for encoding a velocity of a non-stationary portion included in the examination target, and the image generation unit is configured to perform a Fourier transformation on the measurement data for image reconstruction in an encoding direction of the velocity and reconstruct the image.

2. A control method of a magnetic resonance imaging apparatus including a high-frequency magnetic field generation unit configured to generate a high-frequency magnetic field to be applied to an examination target, a gradient magnetic field generation unit configured to generate gradient magnetic fields in three axial directions in a space where the examination target is placed, a measurement unit configured to collect a nuclear magnetic resonance signal generated from the examination target, and an image generation unit configured to generate an image from measurement data consisting of the nuclear magnetic resonance signal collected by the measurement unit, the control method comprising:

using, as a pulse sequence, a spin echo-based pulse sequence including application of a 90-degree pulse and a 180-degree pulse and used to measure a spin echo from a predetermined cross-section of the examination target, the spin echo-based pulse sequence that is used further including application of a slice gradient magnetic field pulse, a phase encoding gradient magnetic field pulse and a readout gradient magnetic field pulse;

applying a pair of gradient magnetic field pulses to at least one axis of three axes of the gradient magnetic field before and after the 180-degree pulse, the pair of gradient magnetic field pulses having the same intensity and polarity, in addition to the slice gradient magnetic field pulse, the phase encoding gradient magnetic field pulse and the readout gradient magnetic field pulse, and using varying intensities of the pair of gradient magnetic field pulses to collect measurement data for image reconstruction including the intensities as information for encoding a velocity of a non-stationary portion included in the examination target; and performing a Fourier transformation on the measurement data for image reconstruction in an encoding direction of the velocity and reconstructing an image.

3. The magnetic resonance imaging apparatus according to claim 1, wherein the image generation unit is configured to reconstruct an image with a velocity of zero as an image of a stationary tissue.

4. The magnetic resonance imaging apparatus according to claim 1, wherein the measurement controller is configured to add the pair of gradient magnetic field pulses to at least one gradient magnetic field axis.

5. The magnetic resonance imaging apparatus according to claim 1, wherein the image generation unit is configured to reconstruct the image by performing a multi-dimensional Fourier transformation on the measurement data for image reconstruction including a velocity encoding axis.

6. The magnetic resonance imaging apparatus according to claim 1, wherein the measurement controller is configured to, in a case of performing a plurality of measurements using the varying intensities of the pair of gradient magnetic field pulses, thin out phase encoding of each measurement to collect necessary phase encoding for image reconstruction across the plurality of measurements.

7. The magnetic resonance imaging apparatus according to claim 1, further comprising: a UI unit configured to accept a user designation for a gradient magnetic field axis to which the pair of gradient magnetic field pulses are added.

8. The control method of a magnetic resonance imaging apparatus according to claim 2, wherein the image to be reconstructed includes an image of a stationary tissue with a velocity of zero.

9. The control method of a magnetic resonance imaging apparatus according to claim 2, wherein, in a plurality of measurements using the varying intensities of the pair of gradient magnetic field pulses to collect the measurement data for image reconstruction, phase encoding is thinned out for each measurement, and necessary phase encoding for image reconstruction is collected across the plurality of measurements.

10. The magnetic resonance imaging apparatus according to claim 4, wherein the spin echo-based pulse sequence used by the measurement unit is a two-dimensional pulse sequence for acquiring measurement data from one slice, and the measurement controller is configured to add the pair of gradient magnetic field pulses to a gradient magnetic field axis in a slice selection direction.

11. The magnetic resonance imaging apparatus according to claim 4, wherein the spin echo-based pulse sequence used by the measurement unit is a three-dimensional pulse sequence including an encoding gradient magnetic field in a slice direction, and the measurement controller is configured to add the pair of gradient magnetic field pulses to three gradient magnetic field axes.

12. The magnetic resonance imaging apparatus according to claim 1, wherein the image generation unit includes a Fourier transformation section configured to perform a Fourier transformation on the measurement data for image reconstruction, and a compression sensing section configured to perform image generation through sequential reconstruction using image data after the Fourier transformation.

13. The magnetic resonance imaging apparatus according to claim 12, wherein the measurement controller is configured to control the gradient magnetic field pulse of the spin echo-based pulse sequence to make at least one of phase encoding or velocity encoding sparse, and the image generation unit is configured to perform image reconstruction by the compression sensing section after performing a Fourier transformation on data for image reconstruction in which at least one of phase encoding or velocity encoding is sparse.

14. The magnetic resonance imaging apparatus according to claim 13,
wherein the number of velocity encodings is five or less.

* * * * *